United States Patent [19]

Groff

[11] 4,405,839

[45] Sep. 20, 1983

[54] TIMED TELEPHONE RING SILENCER DEVICE

[76] Inventor: James W. Groff, P.O. Box 38, Morgan Hill, Calif. 95037

[21] Appl. No.: 353,644

[22] Filed: Mar. 1, 1982

[51] Int. Cl.³ .................. H04M 1/21; H04M 11/02
[52] U.S. Cl. ........................... 179/84 C; 179/84 L; 179/2 BC; 179/2 TC
[58] Field of Search ............... 179/84 R, 84 C, 84 L, 179/81 C, 2 A, 2 BC, 2 TC, 5 R, 5 P, 1 PC

[56] References Cited

U.S. PATENT DOCUMENTS

3,867,584  2/1975  Rengren ..................... 179/2 TC

Primary Examiner—G. Z. Rubinson
Assistant Examiner—James L. Dwyer

[57] ABSTRACT

A timed telephone ring silencer device for selectively disabling the ringer mechanism of an attached telephone for a predetermined timed interval during a time when the user does not wish to be disturbed by telephone calls. The silencer device contains a modular cord and attached plug for connecting the device to a telephone line and a modular jack for connecting a telephone to the device. The silencer device includes a quartz-controlled clock module for providing timing and selection of a timed silent interval, when the ringer mechanism of a cooperating telephone is disabled, as well as traditional clock, calendar, and alarm functions. Also provided are switches which are used to manually initiate a timed silent interval and to immediately enable the ringer mechanism of an attached telephone, if the user wishes to return his telephone to normal operation during a timed silent interval. Indicator lights are provided to inform the device user as to whether or not his telephone is silenced or the device battery needs recharging. The silencer device automatically returns an attached telephone to normal operation following a timed silent interval, so that important calls will not be missed.

4 Claims, 3 Drawing Figures

TIMED TELEPHONE RING SILENCER DEVICE

BACKGROUND OF THE INVENTION

The present invention relates to the field of telephone control devices, and is more particularly directed to a timed telephone ring silencer device which allows the telephone user to selectively disable the ringer mechanism of a telephone attached to the silencer device for a predetermined timed interval.

Because of the proliferation of telephone usage, it is desirable for the telephone subscriber to be able to selectively silence the ringer mechanism of his telephone or telephones when he doesn't wish to be disturbed. This is particularly useful when one doesn't want to hear an annoying telephone ring while sleeping (or trying to), eating, bathing, or simply engaged in a quiet activity. Prior to modern modular telephone connections, the only method of silencing an annoying telephone was to leave the receiver off-hook. Now, of course, a much more efficient method is available: pulling the modular plug. With a telephone so disconnected, the caller hears a ring signal and assumes the person called isn't in, although the person called hears nothing.

In order to obviate the chore of physically "pulling the plug" on a telephone to silence it, several telephones and add-on devices are available which allow the telephone user to turn the telephone "on" and "off" with a simple switch located on the telephone receiver, base, or within the telephone cord as it enters the base. This method is highly efficient, in that it disables the ringer mechanism of a telephone by disconnecting the ring wire. A major disadvantage of the above devices, however, is that the telephone remains disconnected until one remembers to turn it back on. If the telephone isn't reconnected at the proper time, important calls can be missed. It is, therefore, a general object of the present invention to provide a timed telephone ring silencer device which, when attached between a telephone line and a telephone, allows the user to selectively silence the phone's ringer mechanism for a predetermined timed interval.

SUMMARY OF THE INVENTION

Accordingly, the primary object of the present invention is to provide a timed telephone ring silencer device which disables the ringer mechanism of a telephone for a preselected timed interval, whereby the ringer mechanism is again automatically enabled when the preselected timed interval has expired. An additional object of the present invention is to provide a timed telephone ring silencer device which is compact, self-powered, and which provides a modular plug for plugging the silencer device into a telephone line and which provides a modular jack for plugging a telephone into the device. A further object of the present invention is to include a low-power, quartz-controlled timer which is capable of providing timed silent intervals of up to 24 hours, as well as traditional clock, alarm, and calendar functions. Another object of the present invention is to provide easily accessible switches for initiating and canceling timed silent intervals, as well as for selecting the duration of a timed silent interval and for setting traditional clock functions. An additional object of the present invention is to provide indicator lights showing when a timed silent interval is in progress and when the device battery needs recharging. A further object of the present invention is to provide, in one embodiment, ringer silencing means which disable a telephone's ringer mechanism without disabling the telephone's audio circuit. Additional advantages and features of the present invention will be apparent from the following description of preferred embodiments of the invention.

A first preferred embodiment of the present invention provides a compact, self-powered, timed telephone ring silencer device which is connected between a cooperating telephone line and telephone set to selectively disable the ringer mechanism of the telephone set at the user's discretion. The silencer device is provided with a modular cord and attached plug, allowing it to be easily connected to the modular jack of a telephone line. The device is also provided with a modular jack, allowing the modular cord and attached plug of a telephone to be easily connected to the device. Easily accessible switches are provided for the user to silence his telephone for a predetermined timed interval and for immediately enabling the telephone's ringer mechanism, if the user wishes to cancel the timed silent interval. A quartz-controlled liquid crystal display (LCD) clock module is provided which controls timed silent intervals up to 24 hours in duration, as well as providing traditional clock functions, such as time-of-day, calendar, and audible alarm functions. Additional switches are provided to set and selectively display any of the above clock functions and to preset a desired timed silent interval. Indicator lights are also provided to show when a timed silent interval is in progress and when the device's secondary battery needs recharging. In operation, the device user selects a desired timed silent interval corresponding to when an attached telephone is to be silenced by depressing clock control switches in a given sequence. The desired time of termination of the silent interval is then displayed by the clock module for verification of the selected timed interval. The selected timed silent interval is initiated by depressing a "silent" pushbutton switch. During a timed silent interval, the ringer mechanism of an attached telephone is disabled, but automatically returns to normal when the timed interval is completed. At any point during a timed silent interval, the device user can return his telephone to normal operation by depressing a "normal" pushbutton switch. The timed telephone ring silencer device is powered by a rechargeable battery, and, therefore, does not need to be connected to line current. In this embodiment, the telephone remains operative while its associated ringer mechanism is disabled, allowing the device user to call out during a timed silent interval.

A second preferred embodiment is identical to the above, except that an attached telephone is disconnected during a timed silent interval, thereby preventing the device user from calling out when the attached telephone is silenced. When a timed silent interval is completed, or when a "normal" switch is depressed, the cooperating telephone is again automatically reconnected.

DESCRIPTION OF THE PREFERRED EMBODIMENTS

Figure 1:
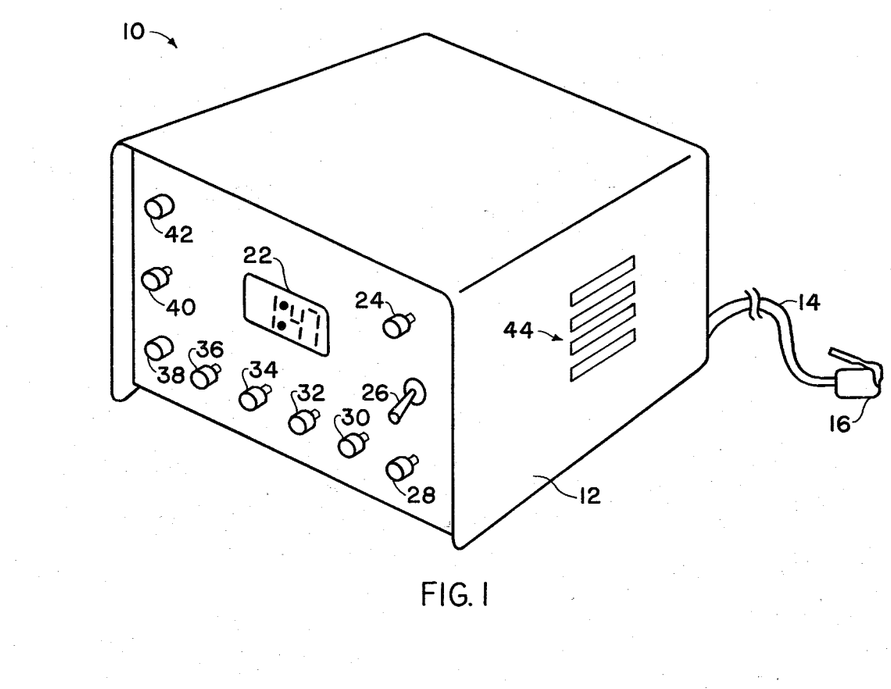
FIG. 1 is a perspective view of the timed telephone ring silencer device of the present invention.

Referring to FIG. 1, a timed telephone ring silencer device 10 is shown. The timed silencer device is designed to selectively silence the ringer mechanism of an attached telephone for a preselected timed interval. The exterior of timed telephone ring silencer device 10 consists of a housing 12, an attached telephone cord 14 and modular plug 16, a modular jack 18 (not shown), a coaxial charge jack 20 (not shown), an LCD clock module 22, a "normal" pushbutton switch 24, a mode toggle switch 26, a "silent" pushbutton switch 28, clock control pushbutton switches 30, 32, 34, and 36, a "low battery" indicator light 38, a "monitor" pushbutton switch 40, a "monitor" indicator light 42, and a sound grile 44. In use, modular plug 16 is inserted into a modular jack of a telephone line, and a telephone is plugged into a modular jack 18 which is located at the rear of housing 12. LCD clock module 22 is set in a fashion similar to all solid-state digital clocks, utilizing clock control switches 32, 34, and 36. Control switch 30 illuminates a lamp contained within the clock module to backlight the liquid crystal display during darkness. The time-of-day and calendar functions of the clock are set using control switches 34 and 36. Control switches 32 and 36 are used to set the clock alarm function which, depending on the position of mode switch 26, actuates a piezoelectric sounder mounted beneath sound grille 44 or enables the ringer mechanism of an attached telephone when a preset alarm time is reached. The alarm duration can be as long as 23 hours and 59 minutes, and is accurate to the second.

Once the clock alarm has been set and mode toggle switch 26 placed in the proper position, a timed silent interval is initiated by depressing "silent" pushbutton switch 28. At this point, the ringer mechanism of an attached telephone set is disabled and remains so for the selected alarm duration. The ringer mechanism is again enabled at the end of the alarm duration, and any incoming telephone calls cause the telephone to ring. If, for some reason, the device user wishes to cancel a timed silent interval in progress, "normal" pushbutton switch 24 is momentarily depressed, causing the telephone ringer mechanism to be immediately enabled so that it will be actuated by incoming line ring signals. To ascertain if a timed silent interval is in progress, the device user can depress "monitor" pushbutton switch 40 which is series connected with "monitor" indicator light 42. When a timed silent interval is in progress, indicator light 42 is illuminated. "Monitor" pushbutton switch 40 is provided to prevent battery drain which would occur if indicator light 42 were continuously illuminated during the entire timed silent interval. The timed telephone ring silencer device 10 is self-powered by rechargeable nickel cadmium cells which are periodically charged by inserting the coaxial plug of a charger into a coaxial "charge" jack 20 provided at the rear of housing 12. A "low battery" indicator light 38 is provided to warn the device user when the battery requires charging. Indicator light 38 is illuminated when battery voltage drops below a predetermined level. As previously described, a piezoelectric sounder is mounted beneath sound grille 44, allowing clock module 22 to be used as a traditional alarm clock with an audible alarm when "mode" toggle switch 26 is set in a proper position. In an alarm mode, the audible alarm sounds at the end of a selected alarm duration, and does not affect the ringer mechanism of an attached telephone.

Figure 2:
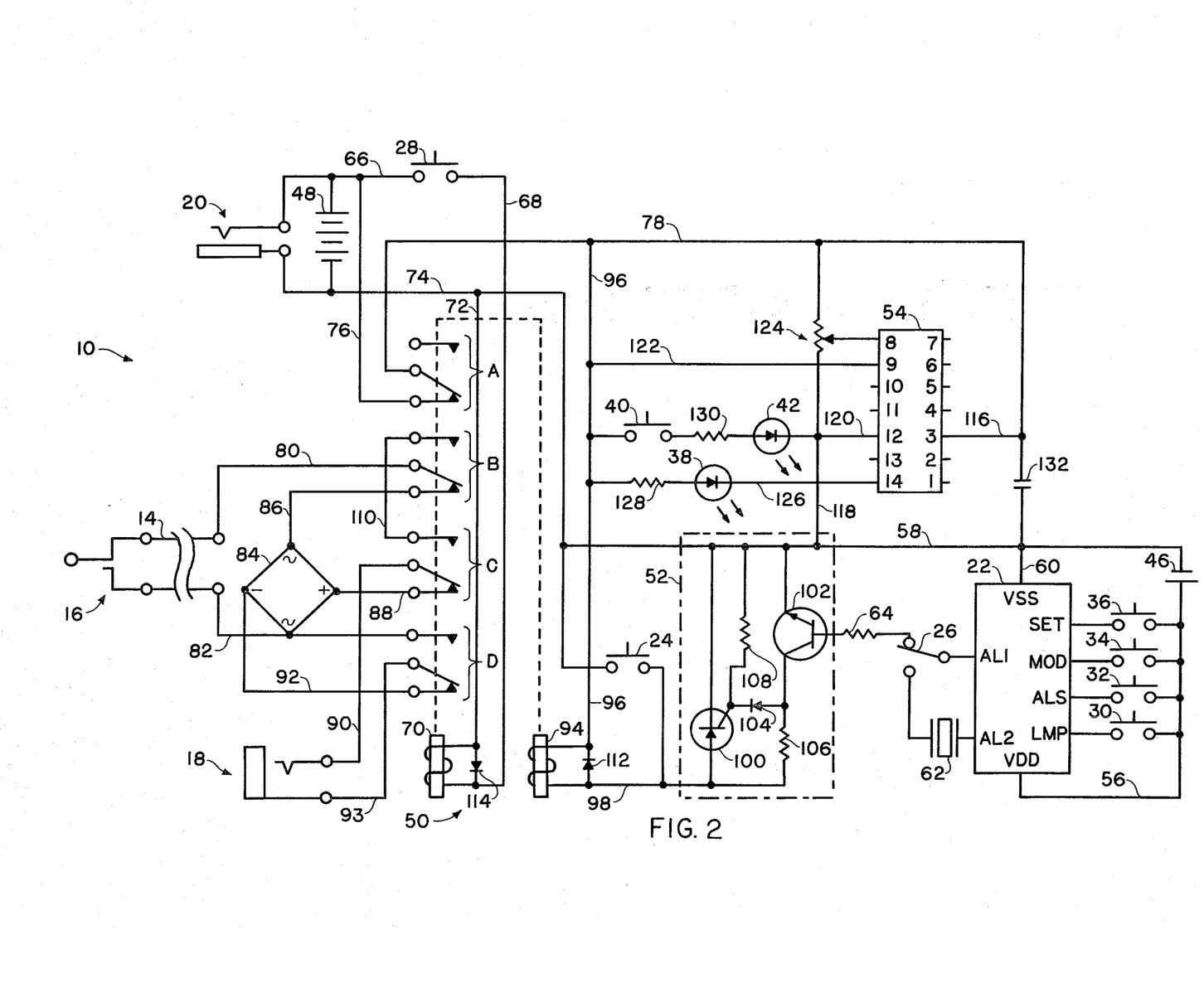
FIG. 2 is a schematic diagram of a first embodiment of the present invention.

Referring next to FIG. 2, a schematic diagram of a first embodiment of the present invention is shown. The timed telephone ring silencer device 10 is powered by a primary power supply comprising a 1.5 V "AA" alkaline battery 46 and a secondary power supply comprising a battery of five 1.25 V "C" nickel cadmium cells 48. Battery 46 powers only clock module 22 and requires replacement at one-year intervals. The 6.25 V nickel cadmium battery 48 powers the remainder of the circuit comprising a dual-coil bistable (latching) relay 50, an interface circuit 52, a 339 linear quad voltage comparator 54, a "low battery" indicator light comprising a light-emitting diode (LED) 38, and a "monitor" indicator light comprising an LED 42. A coaxial power jack 20 is connected in parallel with battery 48, allowing connection of a battery charger when recharge is necessary. Since the nickel cadmium battery provides approximately 1,000 charge-discharge cycles, replacement of the secondary power supply is rarely necessary.

Timing for timed telephone ring silencer device 10 is provided by a liquid crystal display (LCD) clock module 22. Although most LCD clock modules are similar, the one described here is a PCIM-161 distributed by Tandy Corporation. The module is quartz-controlled, using a standard 32,768 kHz digital clock/watch crystal. Since the module provides a 12 or 24-hour time format on an associated alphanumeric display, the module circuit is jumpered to show a 12-hour display. The positive terminal of battery 46 is connected to VDD (+V) via line 56, and the negative terminal is connected to VSS (ground) via lines 58 and 60. Clock control switches 30, 32, 34, and 36 are series connected between the various module terminals, as shown in FIG. 2, and +V line 56.

Clock control switches 34 and 36 are used to set the correct time. Mode (MOD) switch 34 is momentarily depressed to produce a 1-Hz flashing display of the a.m. or p.m. hour-of-the-day. Set (SET) switch 36 is next depressed and held until the correct hour (observing an "a.m." and "p.m." symbol) is displayed. At this time, mode switch 34 is again momentarily depressed, causing the minutes readout to be flashed. Set switch 36 is then depressed and held until the correct minute readout is displayed. The minute setting is usually released when the display reads a minute or so in advance of real time, as compared with a second timepiece, radio or telephone time signal. At this point, the time readout is automatically held until set switch 36 is again momentarily depressed to begin active timing when a subsequent real time signal is exactly identical with the module's minute setting. In this way, clock module 22 can be set to the exact second. To verify and display seconds, set switch 36 is depressed twice in rapid succession. Momentarily depressing switch 36 once returns the display to normal timing.

The calendar function of clock module 22 is set in an identical manner as described above, except that mode switch 34 is initially depressed and held for approximately 3 seconds to access the calendar mode. Mode switch 34 and set switch 36 are next used in the above described manner to set the month, day-of-month, and day-of-week. The day-of-week is displayed by the module's alphanumeric readout as two letters of the week, such as "SU," "MO," "TU," etc. Once the calendar has been set, the current date is recalled by momentarily depressing set switch 36, causing the month and day to be displayed for one second, followed by a one-second display of the day-of-week, and a return to normal timing.

Alarm set (ALS) switch 32 and set switch 36 are used to set the module's alarm function. Alarm set switch 32 is rapidly depressed twice to begin a 1-Hz flashing of the alarm hour. Set switch 36 is next depressed and held until the desired alarm hour (observing an "a.m." and "p.m." symbol) is displayed. Depressing alarm set switch 32 again once causes the alarm minute readout to flash, and set switch 36 is subsequently depressed and held until the desired alarm minute display is reached. At this time, alarm set switch 32 is depressed once to set the alarm for the time selected and to return the clock to normal timing. To later display and verify any alarm setting for one second, alarm set switch 32 is depressed momentarily. To cancel or reset a previously set alarm time, alarm set switch 32 is depressed and held for approximately 3 seconds. As previously described, depression of lamp (LMP) switch 30 illuminates the LCD display so it can be read in darkness.

If an audible alarm is desired, toggle "mode" switch 26 is placed in a first position, connecting a piezoelectric sounder 62 in series between clock module terminals AL1 and AL2. When a preselected alarm time is reached, the sounder emits a tone for 15 half-second intervals. If, on the other hand, a timed silent interval is desired, so the ringer mechanism of an attached telephone is silenced until a selected alarm period has lapsed, toggle "mode" switch 26 is placed in a second position (as shown in FIG. 2) connecting the AL1 terminal of clock module 22 to an interface circuit 52 via a bias resistor 64.

Assuming that a desired alarm duration has been selected, as above described, a timed silent interval is initiated by momentarily depressing "silent" pushbutton switch 28. Nominal 6.25 +V is conducted, via line 66, switch 28, and line 68, to the first coil 70 of bistable relay 50. Relay coil 70 is grounded via lines 72 and 74 and is energized when "silent" switch 28 is depressed, causing the wipers of four sets of SPDT contacts A, B, C, and D to latch in the position shown. Contacts A control power to the remainder of the circuit, allowing +V to be conducted, via lines 66 and 76, and the fixed and wiper contacts of set A, on line 78 when relay 50 is latched as shown. Line 78, in turn, provides +V to the second coil of bistable relay 50, an interface circuit 52, voltage comparator 54, "low battery" LED 38, and "monitor" LED 42.

A cooperating telephone set, connected to the timed telephone ring silencer device via modular plug 18, has its ringer mechanism disabled when relay coil 70 is energized subsequent to momentary depression of "silent" pushbutton switch 28. Telephone cord 14 and attached modular plug 16 connect the silencer device with a telephone line, causing the tip wire to be connected to line 80 and the ring wire to be connected to line 82. With relay 50 in a latched position, as shown in FIG. 2, a full-wave bridge rectifier 84 is connected in series between the telephone line and cooperating telephone set. The tip wire is connected to the rectifier's first AC input via line 80, the wiper and lower fixed contact of set B, and line 86. The ring wire is directly connected to the rectifier's second AC input via line 82. The rectifier's positive output (tip wire) is connected to a cooperating telephone set via line 88, lower fixed and wiper contact of set C, line 90, and modular jack 18. The rectifier's negative output (ring wire) is connected to a telephone via line 92, lower fixed and wiper contacts of set D, line 93, and modular jack 18.

In this configuration, rectifier 68 rectifies AC ring current appearing on an attached telephone line to DC current. Since the ringer mechanism of a telephone is wired in series with a capacitor (so only AC ring current can flow through the ringer), insertion of bridge rectifier 84 between the telephone line and telephone set effectively disables the ringer mechanism. The ringer capacitor blocks any incoming ring signal, thus causing the ringer to remain silent. Although the telephone's ringer mechanism is disabled by the inclusion of rectifier 84, the remainder of the telephone is still operable, allowing the device user to call out when his telephone is silenced. Since audio signals to and from a telephone set are added to and subtracted from a nominal 5-volt off-hook DC bias provided by the telephone line, fidelity of the audio signals is not perceptibly affected by the inclusion of a bridge rectifier.

Relay 50 remains latched in a "timed silent interval" position, as shown, until a preselected alarm period has lapsed. Bistable relay 50 cannot be latched in a second position (whereby the ringer mechanism of an attached telephone is enabled) until the second coil 94 is momentarily energized. When relay 50 is latched in a first position during a timed silent interval, +V is conducted through relay coil 94 via lines 78 and 96, and 98, but is blocked by a silicon controlled rectifier (SCR) 100 of interface circuit 52 when the SCR is in its normal, non-conducting state. The gate of SCR 100 remains at logical "0" and, thereby, prevents conduction of the SCR until the previously described 15-second alarm period occurs at the expiration of a selected alarm time.

The alarm output (AL1) of clock module 22 is normally positive, but drops to logical "0" briefly for 15 times during alarm actuation. Prior and subsequent to alarm actuation, an NPN switching transistor 102 of interface circuit 52 conducts because of the positive bias voltage conducted from clock module output AL1 through "mode" switch 26 and bias resistor 64. The emitter of transistor 102 is connected to ground via lines 74 and 58, causing the anode of a silicon diode 104, which is connected between the transistor collector and a pull-up resistor 106, to remain reverse biased as long as transistor 102 is conducting. Diode 104, which has its cathode connected to the gate of SCR 100, is included in interface circuit 52 to increase the threshold voltage of the gate from 0.6 volt (the drop across the gate-cathode junction of the SCR) to 1.2 V (the gate-cathode drop plus the diode drop) to prevent premature gate triggering. To further prevent premature gate triggering, a pull-down resistor 108 is connected between ground line 58 and the SCR gate to maintain the gate at logical "0" until the clock module alarm is actuated.

When a timed silent interval has lapsed and the alarm of clock module 22 is actuated, output AL1 momentarily drops to logical "0," causing transistor 102 to momentarily switch off. At this point, diode 104 is forward biased by +V voltage conducted on line 98 through resistor 106 which, in turn, swamps pull-down resistor 108 and provides sufficient gate voltage to trigger SCR 100, which has its anode connected to line 98 and its cathode connected to line 58. When the SCR conducts, the circuit is closed between coil 94 of relay 50 and ground line 58, causing the relay coil to be energized. The relay wiper contacts of sets A, B, C, and D subsequently toggle to a second latching position, whereby power is switched off on line 78. SCR 100 is commutated and relay coil 94 is immediately de-energized. Thus, actuation of an alarm signal by clock module 22 following expiration of a timed silent interval automatically energizes a second coil 94 of bistable relay 50, causing the associated relay contacts to latch in a second position.

As above described, when relay 50 is latched in a second position, current from secondary battery 48 is cut off to the device circuit (although primary battery 46 continues to power clock module 22), since the wiper of attached +V line 78 is switched to the upper, non-connected fixed contact of set A. While bistable relay 50 is latched in a second position, bridge rectifier 84 is also switched out of circuit, and a telephone set connected to modular jack 18 is directly connected to a cooperating telephone line via modular plug 16. In this relay position, the telephone line tip wire is connected to the phone's tip wire via modular plug 16, line 80, the wiper and upper contact of set B, jumper wire 110, the upper fixed contact and wiper of set C, line 90, and modular jack 18. The telephone line ring wire is connected to the phone's ring wire via modular plug 16, line 82, the upper contact and wiper of set D, line 93, and modular jack 18. It should be noted that the bistable relay provides isolation between a cooperating telephone line and the remainder of the timed telephone ring silencer device circuit. Of course, when the rectifier is switched out of circuit, the ringer mechanism of an attached telephone is enabled, allowing it to ring normally in response to incoming telephone calls.

In the event the device user wishes to immediately enable the ringer mechanism of his telephone while a timed silent interval is in progress, a "normal" pushbutton switch 24 is momentarily depressed. This normally open pushbutton switch is connected between line 98 and ground line 50, allowing second coil 94 of relay 50 to be energized while SCR 100 is non-conducting. During a timed silent interval, relay coil 94 will also be energized and the telephone ringer mechanism enabled, if the device user changes the position of "mode" toggle switch 26, so that clock module output Al1 is connected to the piezoelectric sounder 62 rather than to bias resistor 64. As soon as the logical "1" bias voltage is removed from resistor 64, SCR 100 triggers, and relay coil 94 is momentarily energized. Silicon diodes 112 and 114 are connected across respective relay coils to protect the silencer circuit from inductive voltage spikes.

To warn the device user that recharge is necessary for nickel cadmium battery 48, a "low battery" indicator light 38 is provided which glows when battery voltage drops below a predetermined level. A 339 linear guad voltage comparator 54 is provided to control a light-emitting diode (LED) which comprises "low battery" indicator light 38. The comparator receives +V via lines 78 and 116, and pin 3. Ground is provided via lines 74, 58, and 120, and pin 12. One of the four noninverting comparator inputs (pin 9) is used as the sample voltage input, and is connected to +V via lines 78, 96, and 122. The associated inverting input (pin 8) is used as the reference voltage input, and is connected to the wiper of a trimmer potentiometer 124. The resistive element of potentiometer 124 is connected between +V and ground, allowing the input threshold trip voltage (reference voltage) to be set to a predetermined level. Since five nickel cadmium cells comprise battery 48, the potentiometer is adjusted so that comparator 54 outputs a logical "0" voltage level when the sample battery voltage on line 122 is at 5.8 volts or below. At this level, each nickel cadmium cell will be at 1.16 volts or less, and requiring recharge. The output for the comparator utilized appears at pin 14 which, in turn, is connected, via line 126, to the cathode of "low battery" LED 38. The LED anode is connected to +V via a current limiting resistor 128 to limit current drain to about 10 mA. When battery recharge is necessary, the comparator output at pin 14 swings to ground, allowing LED 38 to glow. The LED will, of course, briefly flash when power is applied at the beginning of a timed silent interval and when power is cut off at the end of a timed silent interval, but the device user is admonished to recharge the battery only when indicator light 38 is constantly illuminated when either "silent" switch 28 or "normal" switch 24 is depressed.

To give the device user visual indication of when a timed silent interval is in progress, a "monitor" indicator light 42 comprising an LED is provided. The LED anode is connected in series with a current limiting resistor 130 and a normally open, pushbutton "monitor" switch 40 to +V via lines 78 and 96. The LED cathode is connected to ground via lines 118, 58, and 74. Although current limiting resistor 130 holds current consumption to about 10 mA, "monitor" switch 40 is provided to conserve battery current. With this arrangement, the device user must depress switch 40 to observe whether or not a timed silent interval is occurring. "Monitor" LED 42 can only be illuminated by depressing switch 40 while bistable relay 50 is latched in a first position (when the ringer mechanism of a cooperating telephone set is disabled), so that the silencer device is receiving power via line 78. To improve power supply stability, a bypass capacitor 132 is connected between line 78 (+V) and 58 (ground).

Figure 3:
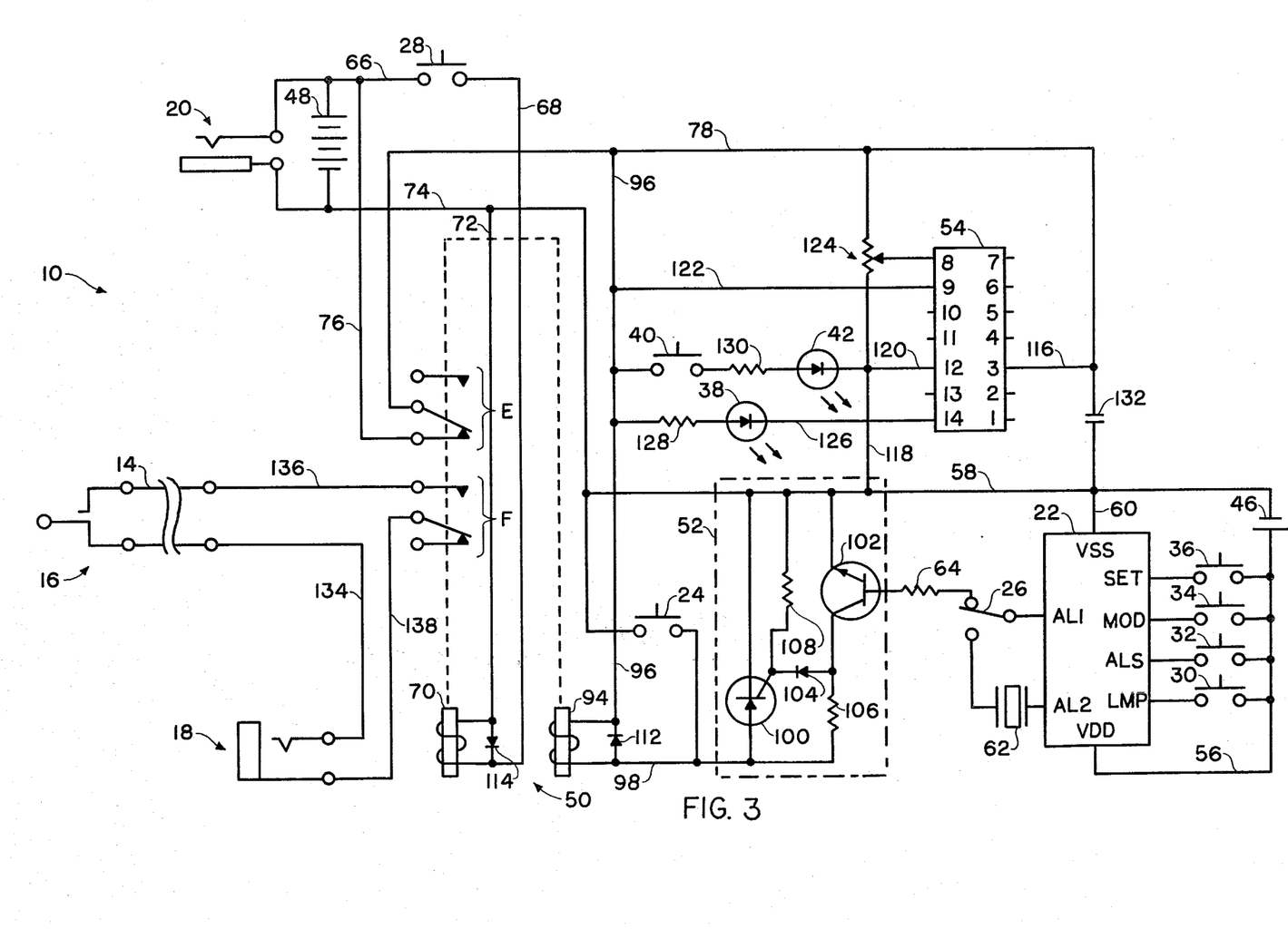
FIG. 3 is a schematic diagram of a second embodiment of the present invention.

Referring now to FIG. 3, a schematic diagram of a second embodiment of the present invention is shown. This embodiment is identical with the previously described embodiment, except that a rectifier is not used to disable the ringer mechanism of a cooperating telephone set. Instead, the telephone is silenced by temporarily disconnecting the ring wire. FIG. 3 shows a dual-coil bistable relay 50 which is again latched in a first position. The telephone line tip wire is connected to a cooperating telephone set via a modular plug 16, attached cord 14, line 134, and modular jack 18. The telephone line ring wire is connected to the phone via modular plug 16, cord 14, line 136, the upper fixed contact and wiper of set F, line 138, and modular jack 18. When bistable relay 50 is latched in a first position, however, the wiper of contact set F is switched to a lower, unconnected contact, thus disconnecting the ring wire (the tip wire can also be used for this purpose) from an attached telephone set.

As in the previous embodiment, a timed silent interval is initiated by momentarily depressing "silent" switch 28, causing the relay to be latched in a first position (as shown) which, in turn, switches +V to line 78 via the lower fixed contact and wiper of set E. A telephone attached to the silencer device is totally disabled during silencing, as if the telephone's modular plug were physically removed from a telephone line jack, and prevents use of the telephone until a selected timed silent interval has lapsed, or until "normal" pushbutton switch 24 is momentarily depressed. As in the previous embodiment, actuation of clock module output AL1 at the end of a timed silent interval causes the second coil 94 of relay 50 to be energized, latching the relay in a second position. At this time, relay contact sets E and F disconnect power to the silencer device circuit and reconnect the telephone line ring wire to that of an attached telephone. As previously described, "normal" pushbutton switch 24 can also be used to manually enable an attached telephone by energizing relay coil 94 which, in turn, reconnects the telephone ring wire. Since all remaining components of this embodiment are identical with those of the previous embodiment, they will not be further described.

Although rechargeable nickel cadmium cells have been described as a secondary power supply for the timed telephone ring silencer device, zinc-carbon or alkaline cells can be used, if the device user wishes to periodically replace them. The device can also be powered by AC line current using an appropriate step-down transformer and rectifier. Although a dual-coil bistable relay has been described as the switching means for the silencer device, a single coil bistable relay can be used with appropriate voltage polarity reversal at the relay coil.

Although a piezoelectric sounder has been described as an audible alarm means for the silencer device, a small speaker can also be used as a sound transducer. The speaker is driven by a PNP transistor which has its base connected, via a bias resistor, to the AL1 output of clock module 22. The speaker is connected between VDD and the transistor's emitter; the transistor's collector is connected to VSS (ground). Since the alarm tone produced by piezoelectric sounders is quite high in frequency (ranging from 2.9 kHz to 6.5 kHz, depending on the product used), a lower, more pleasing frequency (450 Hz to 800 Hz) can be provided by using a low power buzzer. The buzzer can be directly connected to 6.25 V secondary battery 48 by the first position of a DPDT toggle switch which is substituted for SPDT "mode" switch 26, allowing actuation of the buzzer, rather than second relay coil 94, when the SCR of interface circuit 52 is triggered at the end of a selected alarm period. Since the SCR conducts until the anode current is cut off, the associated buzzer sounds continuously until the above DPDT toggle switch is moved to a second position (again connecting the second relay coil with the interface circuit). In this configuration, the alarm function closely resembles that provided by a traditional alarm clock.

Although a modular jack 18 is provided in the silencer device, a short length of telephone cord and attached modular plug can be substituted in its place, so that timed telephone ring silencer device 10 can be directly plugged into the base of a telephone provided with a modular jack. This would eliminate the need for a telephone's orignal base cord.

Although a solid-state digital clock module is provided in the silencer device, any of several solid-state programmable timer/counters can be used to provide timing, but which will not include the clock, calendar and alarm functions incorporated within a clock module. An appropriate time base can be provided by a quartz crystal, a 60 Hz AC line, or by a precision resistor-capacitor oscillator circuit. A rotary switch or thumbwheel switch or switches can be provided for use in selecting a given timed silent interval. Of course, a mechanical or electromechanical timing device can also be used to provide timing for the silencer device. In addition, the utilization of a timing device incorporating a stopwatch function allows the user of the timed telephone ring silencer device of the present invention to time the duration of his toll and long-distance telephone calls.

The terms and expressions which have been employed in the foregoing drawings, abstract, and specification are used therein as terms of description and not of limitation; it being understood that changes may be made in the embodiments disclosed without departing from the spirit and scope of the invention as defined in the following claims.

What is claimed is:

1. A timed telephone ring silencer device for selectively silencing the ringer mechanism of a telphone set for a predetermined timed interval, intended to be connected between a telephone line and a telephone set, said silencer device comprising in combination: a housing equipped with a telephone cord and attached modular plug for connecting said silencer device to a telephone line; timing means for controlling said silencer device, said timing means including a clock, calendar, and alarm mode, the outputs thereof being selectively displayed by an operatively associated alphanumeric readout, said timing means further including sounding means for providing an audible alarm subsequent to a preset timed interval and switch control means for setting said clock, calendar, and alarm modes and for selecting each mode displayed by said alphanumeric readout; a primary power supply for energizing said timing means; a secondary power supply for energizing the remainder of said silencer device; a recharge circuit connected in parallel to said secondary power supply for recharging said secondary power supply; a plurality of switching contacts operatively associated with a first relay coil and a second relay coil of a bistable relay for connecting said secondary power supply to said silencer device and for disabling the ringer mechanism of said telephone set subsequent to energizing said first relay coil, and for disconnecting said secondary power supply from said silencer device and for enabling said ringer mechanism of said telephone set subsequent to energizing said second relay coil; a modular jack operatively connected to said telephone cord and attached modular plug via said plurality of switching contacts for electrically connecting said telephone set to said silencer device; a first manual switching means momentarily connecting said secondary power supply with said first relay coil for connecting said secondary power supply to said silencer device and simultaneously disabling the ringer mechanism of said telephone set when said first relay coil is momentarily energized; a second manual switching means momentarily connecting said secondary power supply with said second relay coil for disconnecting said secondary power supply from said silencer device and simultaneously enabling the ringer mechanism of said telephone set when said second relay coil is momentarily energized; a third manual switching means connecting the alarm mode output of said timing means to either said sounding means, if an alarm function is desired, or to an interface circuit, if timed telephone silencing is desired, the output of said interface circuit being connected to said second relay coil for automatically energizing said second relay coil subsequent to a preset timed interval as controlled by said alarm mode of said timing means; an indicator light connected to said secondary power supply subsequent to energizing said first relay coil for indicating when a timed silent interval is in progress; a voltage comparator and operatively associated voltage divider connected to said secondary power supply for providing an output signal when the voltage of said secondary power supply drops below a predetermined level; and an indicator light connected to the output of said voltage comparator for indicating a low voltage condition.

2. A timed telephone ring silencer device for selectively silencing the ringer mechanism of a telephone set for a predetermined timed interval, intended to be connected between a telephone line and a telephone set, said silencer device comprising in combination: a housing equipped with a telephone cord and attached modular plug for connecting said silencer device to a telephone line; timing means for controlling said silencer device, said timing means including a clock, calendar, and alarm mode, the outputs thereof being selectively displayed by an operatively associated alphanumeric readout, said timing means further including sounding means for providing an audible alarm subsequent to a preset timed interval and switch control means for setting said clock, calendar, and alarm modes and for selecting each mode displayed by said alphanumeric readout; a primary power supply for energizing said timing means; a secondary power supply for energizing the remainder of said silencer device; a recharge circuit connected in parallel to said secondary power supply for recharging said secondary power supply; ringer silencing means for disabling the ringer mechanism of said telephone set; a plurality of switching contacts operatively associated with a first relay coil and a second relay coil of a bistable relay for connecting said secondary power supply to said silencer device and for switching said ringer silencing means into circuit between said telephone line and said telephone set subsequent to energizing said first relay coil, and for disconnecting said secondary power supply from said silencer device and for switching said ringer selecting means out of circuit subsequent to energizing said second relay coil; a modular jack operatively connected to said telephone cord and attached modular plug via said plurality of switching contacts and said ringer silencing means for electrically connecting said telephone set to said silencer device; a first manual switching means momentarily connecting said secondary power supply with said first relay coil for connecting said secondary power supply to said silencer device and simultaneously disabling the ringer mechanism of said telephone set when said first relay coil is momentarily energized; a second manual switching means momentarily connecting said secondary power supply with said second relay coil for disconnecting said secondary power supply from said silencer device and simultaneously enabling the ringer mechanism of said telephone set when said second relay coil is momentarily energized; a third manual switching means connecting the alarm mode output of said timing means to either said sounding means, if an alarm function is desired, or to an interface circuit, if timed telephone silencing is desired, the output of said interface circuit being connected to said second relay coil for automatically energizing said second relay coil subsequent to a preset timed interval as controlled by said alarm mode of said timing means; an indicator light connected to said secondary power supply subsequent to energizing said first relay coil for indicating when a timed silent interval is in progress; a voltage comparator and operatively associated voltage divider connected to said secondary power supply for providing an output signal when the voltage of said secondary power supply drops below a predetermined level; and an indicator light connected to the output of said voltage comparator for indicating a low voltage condition.

3. The timed telephone ring silencer device according to claim 2, wherein said ringer silencing means include a rectifier, the inputs thereof being operatively connected to said plurality of switching contacts to said telephone line, and the outputs of said rectifier being operatively connected by said plurality of switching contacts to said telephone set for rectifying AC ring signals appearing on said telephone line.

4. A timed telephone ring silencer device for selectively silencing the ringer mechanism of a telephone set for a predetermined timed interval, intended to be connected between a telephone line and a telephone set, said silencer device comprising in combination: a housing equipped with a telephone cord and attached modular plug for connecting said silencer device to a telephone line; timing means for controlling said silencer device, said timing means including a clock, calendar, and alarm mode, the outputs thereof being selectively displayed by an operatively associated alphanumeric readout, said timing means further including sounding means for providing an audible alarm subsequent to a preset timed interval and switch control means for setting said clock, calendar, and alarm modes and for selecting each mode displayed by said alphanumeric readout; a primary power supply for energizing said timing means; a secondary power supply for energizing the remainder of said silencer device; a recharge circuit connected in parallel to said secondary power supply for recharging said secondary power supply; a plurality of switching contacts operatively associated with a first relay coil and a second relay coil of a bistable relay for connecting said secondary power supply to said silencer device and for disabling the ringer mechanism of said telephone set by disconnecting one side of said telephone line subsequent to energizing said first relay coil, and for enabling said ringer mechanism of said telephone set by reconnecting said one side of said telephone line subsequent to energizing said second relay coil; a modular jack operatively connected to said telephone cord and attached modular plug via said plurality of switching contacts for electrically connecting said telephone set to said silencer device; a first manual switching means momentarily connecting said secondary power supply with said first relay coil for connecting said secondary power supply to said silencer device and simultaneously disabling the ringer mechanism of said telephone set when said first relay coil is momentarily energized; a second manual switching means momentarily connecting said secondary power supply with said second relay coil for disconnecting said secondary power supply from said silencer device and simultaneously enabling the ringer mechanism of said telephone set when said second relay coil is momentarily energized; a third manual switching means connecting the alarm mode output of said timing means to either said sounding means, if an alarm function is desired, or to an interface circuit, if timed telephone silencing is desired, the output of said interface circuit being connected to said second relay coil for automatically energizing said second relay coil subsequent to a preset timed interval as controlled by said alarm mode of said timing means; an indicator light connected to said secondary poweer supply subsequent to energizing said first relay coil for indicating when a timed silent interval is in progress; a voltage comparator and operatively associated voltage divider connected to said secondary power supply for providing an output signal when the voltage of said secondary power supply drops below a predetermined level; and an indicator light connected to the output of said voltage comparator for indicating a low voltage condition.

* * * * *

UNITED STATES PATENT AND TRADEMARK OFFICE
CERTIFICATE OF CORRECTION

PATENT NO. : 4,405,839

DATED : September 20, 1983

INVENTOR(S) : James W. Groff

It is certified that error appears in the above-identified patent and that said Letters Patent is hereby corrected as shown below:

Column 3, line 17, "grile" should read -- grille --.

Column 4, line 26, "Tandy Corporation" should read -- Printed Circuits International, Inc. --.

Column 4, line 27, "32,768" should read -- 32.768 --.

Column 5, line 51, "plug" should read -- jack --.

Column 6, line 3, "68" should read -- 84 --.

Column 7, line 36, "50", first occurrence, should read -- 74 --.

Column 11, line 34, "selecting" should read -- silencing --.

Column 12, line 2, "to", first occurrence, should read -- by --.

Signed and Sealed this

Thirty-first Day of January 1984

[SEAL]

Attest:

GERALD J. MOSSINGHOFF

Attesting Officer

Commissioner of Patents and Trademarks